July 20, 1937. J. SCHADE 2,087,740
POST BINDER FOR LOOSE LEAF SHEETS
Filed Oct. 4, 1935 3 Sheets-Sheet 3
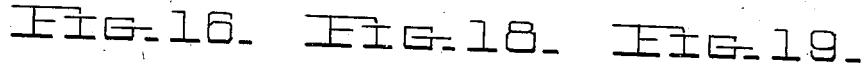
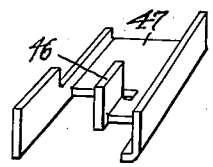
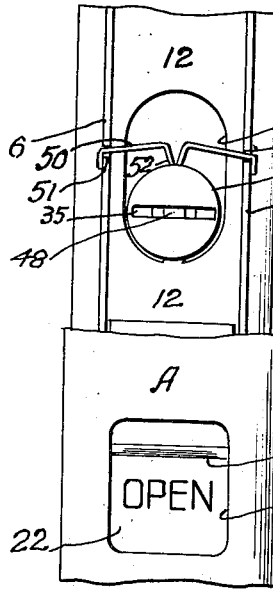
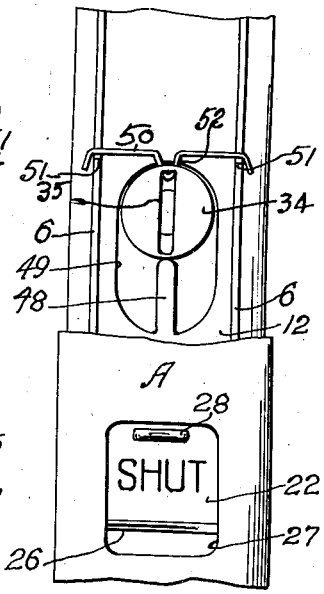
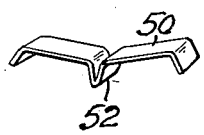
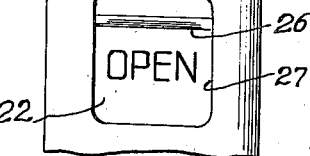
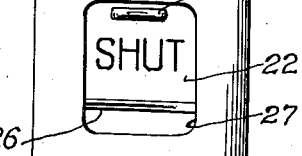
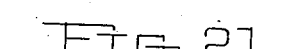
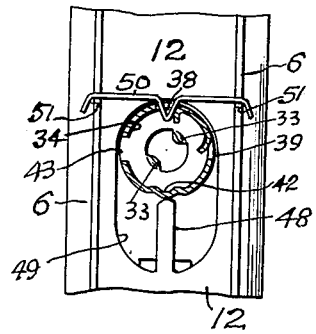
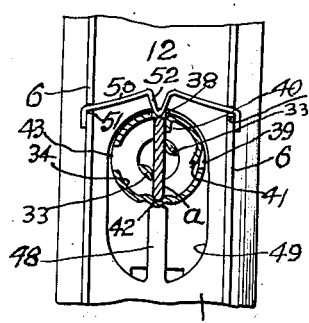
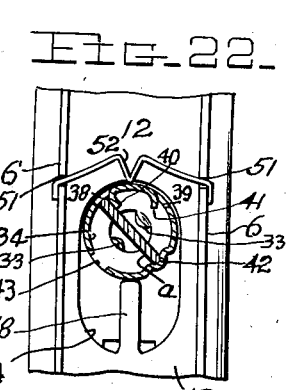
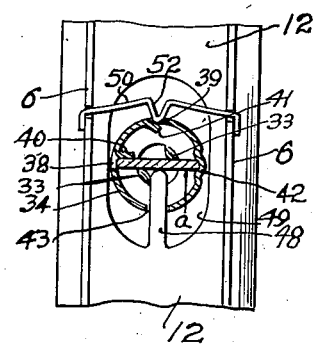
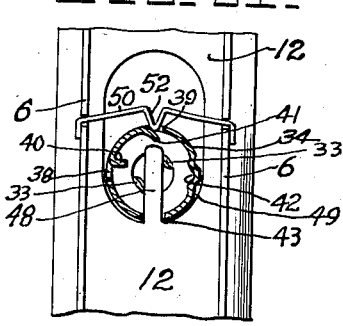
Inventor
John Schade
by [signature]
Attorney Patented July 20, 1937

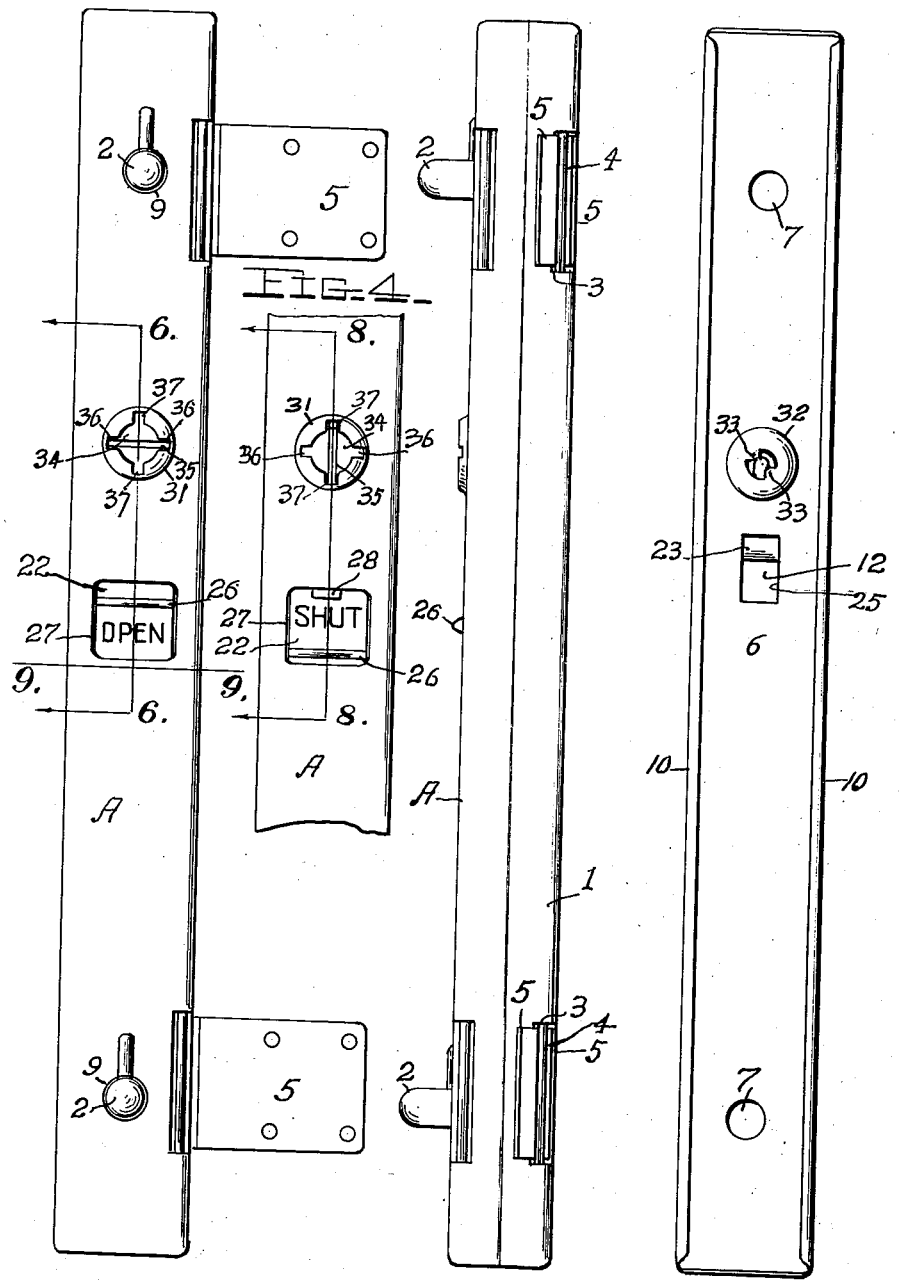

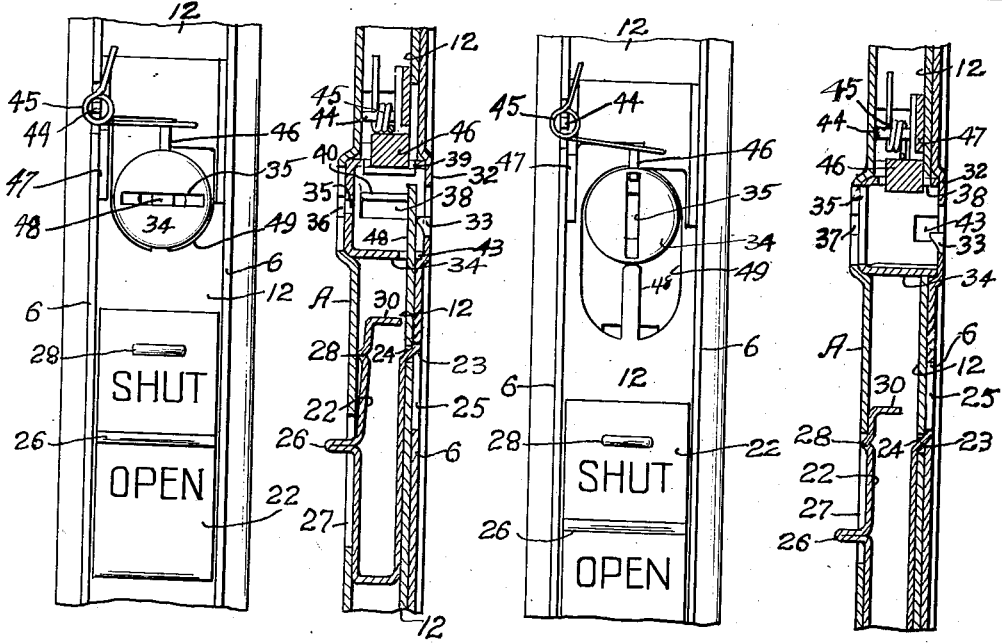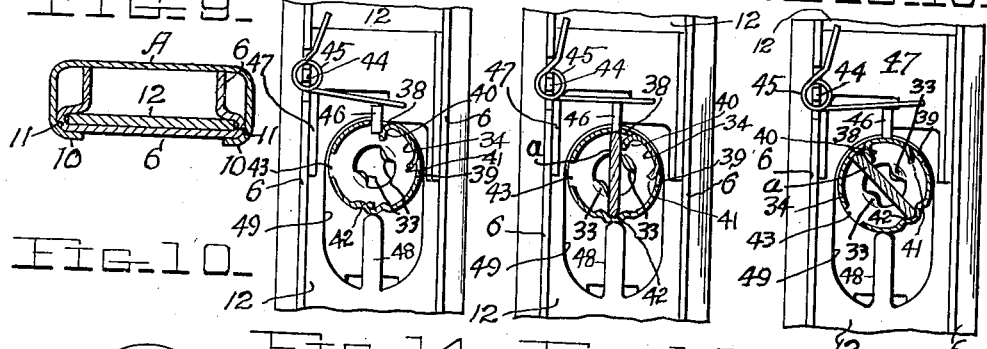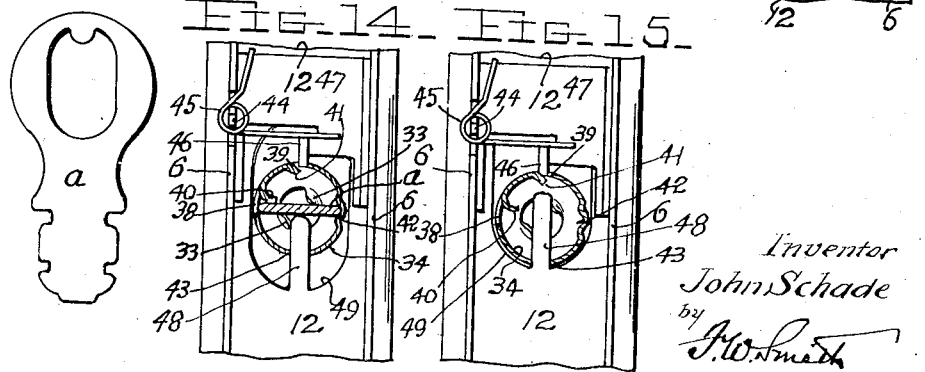

2,087,740

UNITED STATES PATENT OFFICE 2,087,740

POST BINDER FOR LOOSE LEAF SHEETS

John Schade, Holyoke, Mass., assignor to National Blank Book Company, Holyoke, Mass., a corporation of Massachusetts Application October 4, 1935, Serial No. 43,471

9 Claims. (Cl. 129—4)

My invention relates to post binders for loose leaf sheets, and is intended as an improvement on the construction shown and described in Letters Patent issued to me December 11, 1934, No. 1,983,779, but is confined solely to the locking means whereby the sections of the binder are rendered free to be separated or are locked together. In the patented structure, the operator would frequently fail to fully insert the key and would then attempt to turn the key and then wreck the locking means. In the present invention, the part that insures the locking engages within the side of the lock cylinder, and when the key is inserted such part is primarily thrust out of the cylinder, thus permitting the latter to be turned. Also the cylinder is formed with a guide for the key, and the bottom of the upper section is perforated to center and hold the key, and this perforation has inturned lugs that act as stops against which the key abuts when turned to lock or unlock the sections, thereby removing all strain on the cylinder if undue force is used in manipulating the key.

All the parts of the present invention are identical, both as to structure and function, with the parts in the patented device, except those that are intimately connected with the lock, and, in the drawings of this invention, some of these identical parts are shown, but they will be designated by the same numerals that are used to designate said parts in the drawings of said patent, this being done in order to clarify the present invention, and to facilitate comparison of the patented and present inventions. In the accompanying drawings are shown two styles of resiliently operating latching devices that function to lock the cylinder when the sections are united and also to steady the cylinder, as against accidental displacement when the sections are unlocked and free, but, so long as the latches are resilient and engage within openings in the side of the cylinder, the invention is not limited in this respect.

In the accompanying drawings, Figures 1, 2, and 3 are respectively top and inner edge and bottom views of my invention when the parts have been unlocked, the key removed and the thumb piece operated to free the sections. Figure 4 is a plan view with the ends broken away and similar to Figure 1 except that the thumb piece has been operated to unite the sections and the cylinder turned by the key to lock the sections. Figure 5 is a plan view broken away at the ends and with the top casing removed, and showing the position of parts as they appear in Figure 1 when the sections are unlocked and the thumb piece operated to free said sections. Figure 6 is a section at line 6—6, of Figure 1. Figure 7 is a view similar to Figure 5, but with the thumb piece withdrawn to secure the sections together, and the key cylinder operated to finally lock said sections together. Figure 8 is a section at line 8—8 of Figure 4. Figure 9 is a section at line 9—9 of Figure 1. Figure 10 is an elevation of the key. Figure 11 is a fragmental view similar to Figure 7, but showing the key cylinder sectioned horizontally and showing particularly the engagement of the resilient latch within the side of the key cylinder. Figure 12 is similar to Figure 11, but showing the key inserted in the cylinder to displace the latch preparatory to the turning of said cylinder to unlocked position. Figure 13 is like Figure 12, except that it shows a partial rotation of the cylinder. Figure 14 is like Figure 13, except that it shows the cylinder fully operated by the key to unlocked position, and the main slide operated by the thumb piece into partial engagement with said cylinder and also showing the latch engaged in a slight opening in the side of the cylinder sufficient to prevent accidental displacement of the latter. Figure 15 is like Figure 14 but with the key removed and the main slide operated to completely free the sections so that they may be separated. Figure 16 is a detail perspective of a freely moveable auxiliary slide contained within the upper casing, and showing particularly the upturned latch member that appears especially in Figures 5, 6, 7, 8, 11, 12, 13, 14, and 15, and which is spring urged toward the cylinder, and forms one style of latch, as will be hereinafter more in detail described. Figure 17 is a detail perspective of another form of spring latch. Figures 18 and 19 are like Figures 5 and 7, except that the style of spring latch shown at Figure 17 is employed. Figures 20, 21, 22, 23, and 24, are respectively like Figures 11, 12, 13, 14, and 15, except as to the form of latch member which is that shown at Figure 17. Similar numerals of reference will be used to denote like parts in the several figures of the drawings.

It is not necessary to describe any of the parts housed by the upper cover or casing A, with the exception of the elements that are directly associated with the locking mechanism, and, although such parts, as they appear in the present drawings, are identified by the same reference numerals as those used in the drawings of said patent to designate said parts, some of the latter will be referred to incidentally in order to make the present invention clear. Posts 2 project from the lower member 1 to receive the perforated sheets that are placed within the binder, and the member 1 has recesses 3 formed in its inner edge at spaced locations, within which recesses is a rod 4 that serves as a pintle for clips 5 that extend outwardly and are secured to any suitable back cover (not shown) in the usual manner, since the attaching of covers to either the members A or 1 forms no part of my present invention and is old and well known.

The inner casing 6 has perforations 7 to admit the posts 1, and the member A has perforations 9 for the same purpose, said member A being placed over the casing 6 after the operative parts are assembled and tested, said member closing the top, sides and ends of said casing and secured to the latter in any suitable manner, as shown at 10 in Figures 3 and 9.

The sides of the bottom edges of the casing are bent upwardly and inwardly to form channel bearings 11, and the slide 12 is flat, rests upon the bottom of the casing throughout its length and is guided and retained within the bearings 11.

The thumb-piece 22 is a resilient member closed at one end and open at the other end, the lower part of said member terminating in a lug 23 that engages through a slot 24 in the slide within an opening 25 in the bottom of the casing, as shown at Figures 6 and 8, the end walls of said opening serving to limit the operations of the slide by the abutment of said lug against said walls, and the structure and functions of these parts 2, 3, 4, 5, 7, 10, 11, 23, 24, and 25 are precisely like the structure and functions of the parts designated by these same numerals in my aforesaid patent. Referring to the section A, the upper part of the latter, which envelops the inner casing that contains the operative parts mentioned in said patent, has integral therewith a circular open housing 31 forming a recess, while the base of said section has a seat or recess forming housing 32 that is perforated at the bottom and has inturned lips 33. While the sections 1 and A may be fairly secured together by the manipulation of the member 22 to operate the slide 12 as shown and described in said patent, and the locking means shown in said patent manipulated to augment and stabilize the securement of these sections, it has frequently happened that the operator has turned the lock key without first inserting said key far enough to release the lock cylinder, thus wrecking the locking means, and it is the special object of the present improvement to provide a locking mechanism that will prevent this defect, and the mechanism will now be described. 34 is the locking cylinder or shell which is journaled within the housings 31, 32, and is open at the bottom and closed at the top save for a key slot 35.

The upper housing 31 slightly overlaps said cylinder and has diametrically opposed gates 36, 37 that register with the slot 35 when the cylinder has been turned to free or lock the actions as will be hereinafter more fully described. The cylinder has in its side comparatively wide and narrow vertically disposed slots or openings 38, 39, that are spaced apart 90°, and along one edge of these openings are preferably inturned curved lips 40, 41 to facilitate the turning of the cylinder. These openings 38, 39 extend substantially to the top of the cylinder and are respectively diametrically opposite a vertical key guide 42 in the cylinder and a gate 43 in the bottom of the cylinder. The latch member, hereinafter to be described, is spring impelled to laterally enter the openings 38, 39 so that the insertion of the key will initially thrust said member out of the cylinder, while the turning of the key will cause said member to contact the outer wall of said cylinder to cause said member to enter either one of the openings 38 or 39. In the present improvement when the key has been turned athwart or at right angle to the length of the binder, the key is removed and the operation of the slide, in the manner hereinafter to be described, will free the sections and the word "Open" will appear through the opening 27 in the cover or envelop A, and the latch member will engage the small opening 39 to steady the cylinder during the manipulation of the binder, but when said latch member is engaged within the opening 38 the cylinder is locked. Two forms of spring impelled latch or lock members are shown, and the one shown in Figures 5, 6, 7, 8, 11, 12, 13, 14, 15, and 16 will now be described. The casing 6 is cut away so as to provide a vertical post 44 around which a coil spring 45 is placed, one end of said spring impinging against said casing, while the other end normally impels a latch or lock member 46 toward the cylinder. This member 46 is upturned from an auxiliary slide 47, as shown at Figure 16, that rests on the main slide 12, and these slides are moveable independent of each other. When the key slot is athwart the binder and the key removed, the thumb piece 22 is depressed to bring the cross-rib 28 below the cover A and the slide 12 is then operated by pushing the finger hold 26 so as to drive the tongue 48 within the gate 43 in the bottom of the cylinder, and the latch member will engage the small opening 39 as before stated.

The slide 12 is cut away and said tongue 48 left projecting within this cut away portion 49, this tongue functioning in the same manner as the rib 37 in the patented device as shown at Figures 5, 6, 14, and 15, and the sections of the binder are now free to be separated or assembled as the case may be.

After the key has been removed and the tongue 48 withdrawn the parts will be in the position for the insertion of the key within the slot 35 and the gates 36, and a quarter turn of the key will turn the cylinder so that the latch member will ride against the outer wall of the cylinder as shown at Figure 13, and then be in position to enter the large slot 38 on the withdrawal of the key whereupon said member will enter said slot and lock the sections together as shown at Figure 11. The insertion of the key a within the slot 35 and gates 37, will initially force the latch member out of the large slot 38, as shown at Figure 12, and the turning of the cylinder by the key will bring said member in position to enter the small opening 39, and will also bring the gate 43 opposite the tongue 48, and when the key has been withdrawn, the side 12 is operated to cause the tongue to fully enter said gate, as shown in Figures 5, 6, and 15.

When the tongue has been withdrawn from the cylinder the word "Shut" will appear through the opening 27 and the key slot will appear athwart the binder, and the key can now be inserted and turned to bring the parts to locking position. Another form of latch member is shown at Figures 17, 18, 19, 20, 21, 22, 23, and 24, but it functions precisely like the latch member heretofore described and the member shown in these figures is a sheet metal spring 50 whose ends are loosely engaged through openings 51 in opposite sides of the casing 6, and whose central part is V-shaped as shown at 52, and is always impelled toward the cylinder, as shown at Figures 18, 21, 22, 23, and 24, and the function of this V-shaped part with respect to the cylinder is precisely like that of the latch member heretofore described, and therefore requires no elucidation. The upper housing 31 slightly overlaps the top of the cylinder 34 so as to confine the latter, but, as the key slot 35 must extend nearly to the side wall of the cylinder, in order that the bottom of the key may initially, when inserted within the slot 35, force the spring impelled latch member outside said wall so that the key may be turned with said member impinging against the outer side of said wall, said gates 36, 37, are provided and function as extensions of the key slot when the key has been turned to either locking or unlocking positions, thus permitting the key to be inserted or withdrawn. But when the key has been turned only partly toward locked or unlocked positions, it cannot be withdrawn since the overlapping portion of the housing 31 is engaged within the uppermost deep slots in the edges of the key, and it is also true that, when the key is fully inserted, said engagement permits the key to be turned to allow the latch member to engage within either the wide opening 38 or the narrow opening 39, the wide opening 38 permitting this latch member to pass the lip 40, while the narrow opening 39 causes the latch member to abut the lip 41 so that said member can ride easily out of this opening 39 upon rotation of the cylinder. The details of construction heretofore described may be varied without departing from the spirit of this invention, and it is therefore desired that any patent that may be granted therefor should not be limited except by the prior art and the appended claims.

What is claimed is—

1. In a post binder for loose leaf sheets, comprising a bottom section which carries posts for said sheets, a top section perforated to accommodate said posts and comprising an inner casing that carries releasable devices for gripping said posts, in combination with a slide for releasing said gripping devices guided at the bottom of said casing and cut away intermediate its length, a tongue integral with said slide and projecting within said cut away portion, a rotary hollow lock cylinder for said slide having a key slot in its top and comparatively wide and narrow vertical openings in its side wall, and a gate in its bottom edge through which said tongue is driven by the movement of said slide to release the posts, a spring impelled latch member which enters said openings, a key which is inserted within said slot above and to engage said member and functions to initially force the latter without the wide opening, a seat in the bottom of said casing for said cylinder, said seat having a perforation into which the bottom of the key extends when the latter is fully inserted within said slot, and spaced lugs inturned from the edge of said perforation against which lugs the key impinges when it is turned to locked or unlocked positions.

2. A construction as in claim 1, with the addition that an upper cover envelops the casing and has a raised circular portion within which the top of the cylinder is journaled, said portion being open at the top and slightly overlapping said cylinder and having diametrically opposite gates which register with the key slot when the latter is in locked or unlocked position.

3. A post binder for loose leaf sheets, comprising a lower post carrying section and an upper section perforated to receive the posts, the latter section consisting of an inner casing and a cover enveloping and secured to the same, a post releasing slide guided in the bottom of said casing and cut away and having an integral tongue projecting within the cut away part, a key cylinder, a perforated circular seat for the key cylinder in the bottom of said casing, said cylinder open at the lower end and having a key slot in its top which latter is journalled within a circular open housing integral with said cover, said housing slightly overlapping said top and having diametrically opposite key receiving gates that register with said slot when the cylinder has been turned to either locked or unlocked position, said cylinder having in its side comparatively wide and narrow spaced openings which are vertically disposed, a spring impelled element which engages said slots when the sections are locked or unlocked, a key adapted to enter said slot above and to engage said member and functioning to drive the latter without the wide opening, the bottom of said cylinder having a gate which is positioned by the turning of the cylinder directly opposite said tongue, whereby, when the key is removed, said slide may be operated to thrust said tongue into said gate and thereby permit the upper section to be withdrawn from the lower section.

4. A construction as in claim 3, with the addition that when the key has been manipulated to bring the tongue opposite the cylinder gate, the spring impelled element will engage within the comparatively narrow slot in the cylinder.

5. In a post binder for loose leaf sheets that consists of a lower post carrying section and an upper section having perforations through which the posts project, a manipulative post releasing slide in said upper section and operable to cooperate with means for securing or freeing said sections, and a key operated lock for said slide comprising a rotatable cylinder open at the bottom and having a key slot at the top, said cylinder having in its side comparatively wide and narrow openings and also having a gate in its bottom edge opposite said narrow opening and confined at the top and bottom within journals in the upper and lower faces of said upper section, a spring impelled latch member adapted to enter said openings and engage the sides thereof to retain the cylinder against rotation, a key to be inserted within said slot to primarily engage and force said member without said opening that is wide and cooperates with said member to lock said cylinder, said slide carrying means that enters said gate when the slide has been manipulated after the removal of the key to release the sections, said member positioned within the upper section and adapted to be forced within the wider opening in the cylinder when the slide has been manipulated to withdraw the tongue and the cylinder turned by the key to bring said slot opposite said member.

6. A construction as in claim 5, with the addition that the upper section consists of an inner casing and a cover secured thereto, and that the top of the cylinder is journalled within an overlapping housing integral with said cover and having diametrically opposite key receiving gates that register with the key slot when the sections are either locked or unlocked.

7. A post binder having a bottom section carrying posts for loose leaf sheets, a top section perforated to receive said posts and containing releasable devices for gripping said posts, means for releasing said devices, and housings within the upper and lower faces of said top section, in combination with a key operated cylinder journalled within said housings to retain said means out of releasing position and having a key slot in its upper part and comparatively wide and narrow openings vertically disposed in its side wall, a spring impelled latch member adapted to enter and to engage said openings from the outside, a key to be inserted through said slot above and to engage said member, and means in the bottom housing for limiting the movements of the key after it has been fully inserted and operated to turn said cylinder to either cause said gripping devices to bind against said posts to lock said sections or to release said devices from said posts to unlock said sections.

8. A post binder having a bottom section with sheet carrying posts, a perforated top section containing releasable devices for gripping said posts and means for releasing said devices, in combination with a lock for securing said means out of releasing position, said lock being composed of a hollow cylinder journalled within said top section and having a key slot in the top and comparatively wide and narrow vertical openings in the side wall, a latch member co-operating with said openings to lock the cylinder when the latch member is in the wide opening and steady same against accidental movements when in the narrow opening, and a key adapted to be inserted within said slot above and to engage said member to initially force the latter without the cylinder and permit it to be unlocked.

9. A lock for securing and freeing the sections of a post binder, consisting of a cylinder having a key slot in the top and comparatively wide and narrow openings vertically disposed in the side wall, a guideway for said key in the inner wall of said cylinder, a spring impelled latch member in close proximity to said top and slot and co-operating with said openings, and a key adapted to be inserted within said slot immediately against said member, whereby the latter is initially forced without the cylinder to thereby release said cylinder and permit it to be turned with its outer wall contacting said member.

JOHN SCHADE.